Sept. 25, 1934.  A. B. MILOSEVICH  1,974,503
BREAD TWISTER
Filed April 21, 1934  7 Sheets-Sheet 1

Inventor
*Albert B. Milosevich*,
By *Clarence A. O'Brien*
Attorney

Sept. 25, 1934.　　A. B. MILOSEVICH　　1,974,503
BREAD TWISTER
Filed April 21, 1934　　7 Sheets-Sheet 4

Inventor
Albert B. Milosevich,
By Clarence A. O'Brien
Attorney

Sept. 25, 1934.  A. B. MILOSEVICH  1,974,503
BREAD TWISTER
Filed April 21, 1934   7 Sheets-Sheet 5
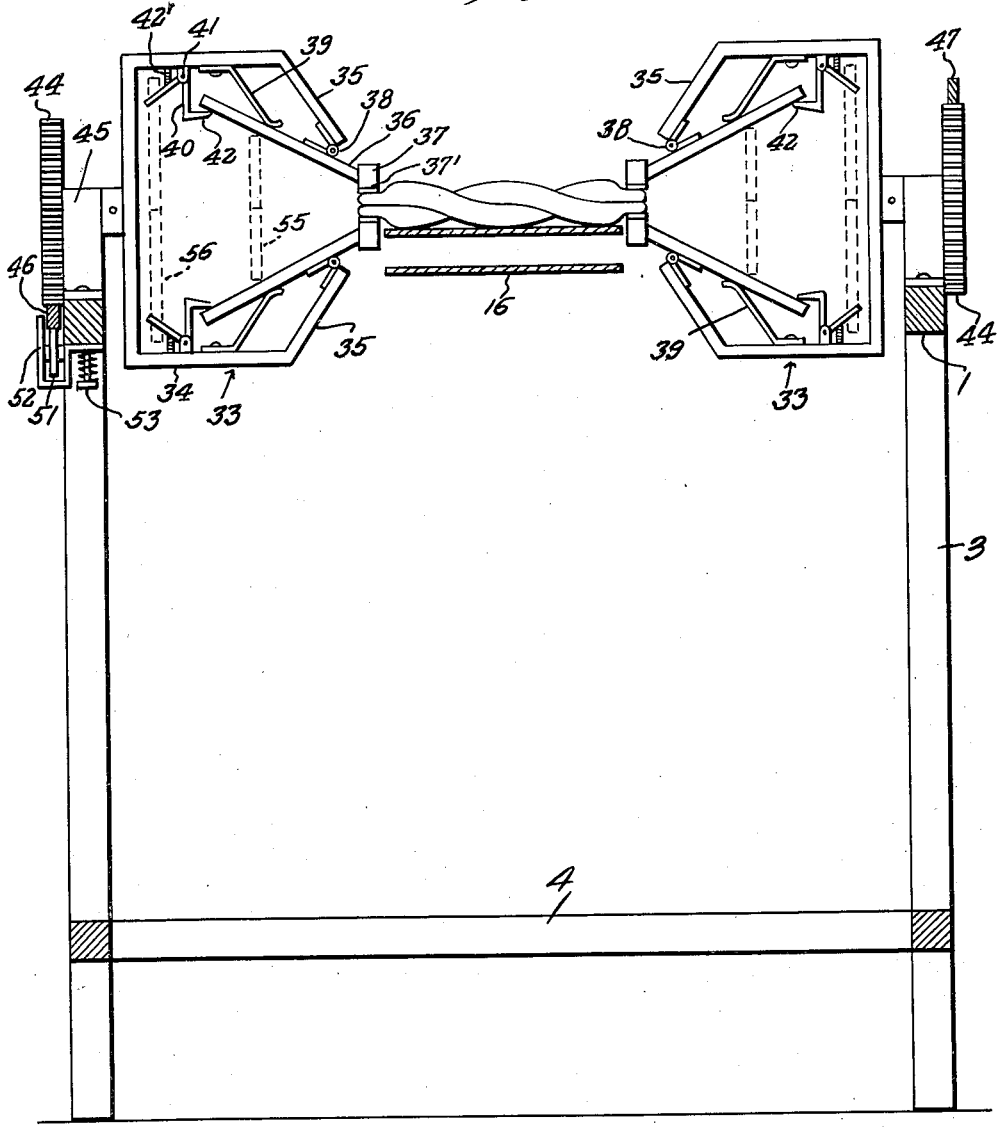
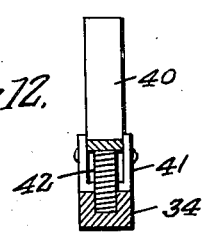
Inventor
Albert B. Milosevich,
By Clarence A. O'Brien
Attorney Sept. 25, 1934.　　　A. B. MILOSEVICH　　　1,974,503
BREAD TWISTER
Filed April 21, 1934　　7 Sheets-Sheet 6
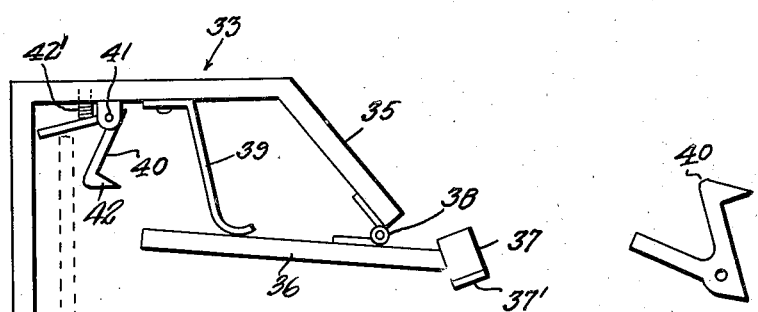
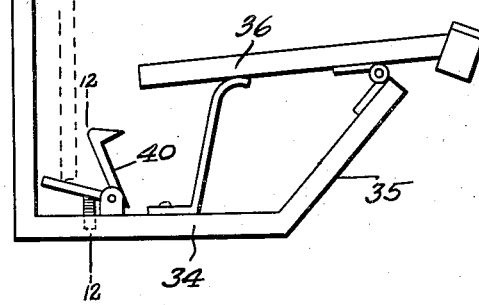
Inventor
Albert B. Milosevich,
By Clarence A. O'Brien
Attorney Sept. 25, 1934.  A. B. MILOSEVICH  1,974,503
BREAD TWISTER
Filed April 21, 1934   7 Sheets-Sheet 7
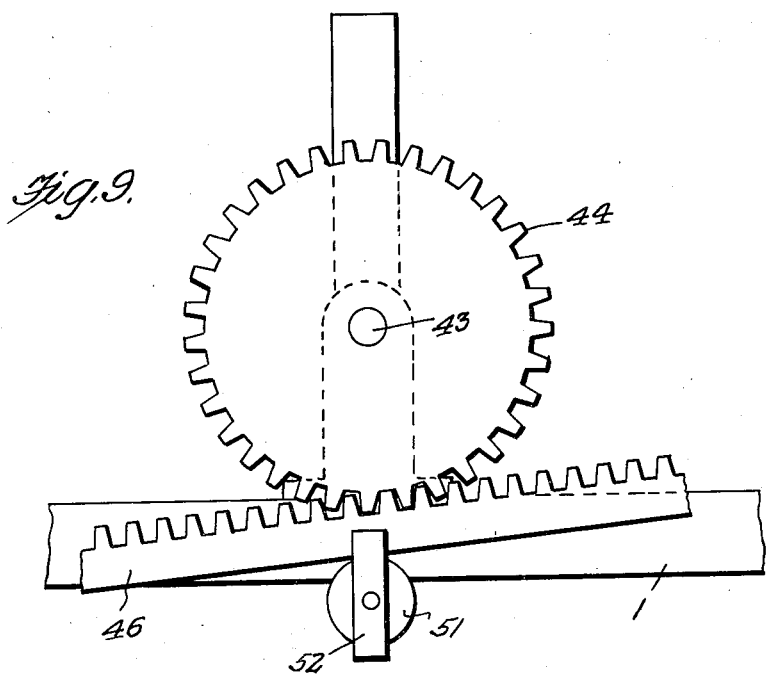
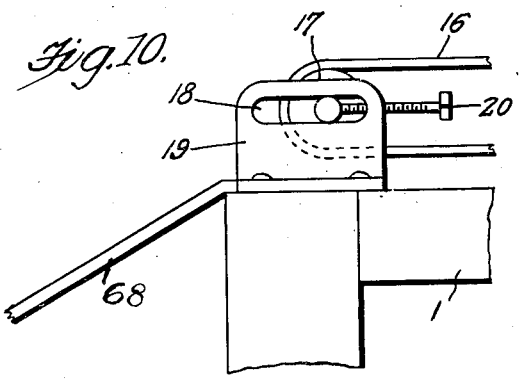
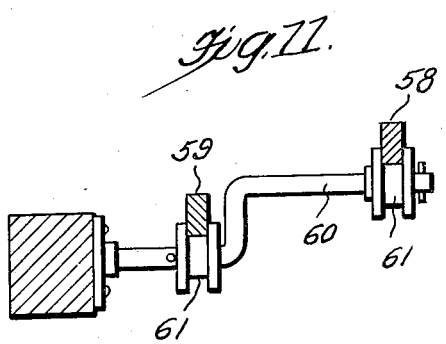
Inventor
*Albert B. Milosevich,*
By *Clarence A. O'Brien*
Attorney Patented Sept. 25, 1934

1,974,503

UNITED STATES PATENT OFFICE 1,974,503

BREAD TWISTER

Albert Blaise Milosevich, Des Moines, Iowa

Application April 21, 1934, Serial No. 721,817

3 Claims. (Cl. 107—9)

This invention relates to a machine for twisting loaves of bread so as to make the texture of the bread finer and also to make the grain finer.

The general object of the invention is to provide a conveyor for feeding the loaves to the pairs of jaw members, means for causing the jaws to grip the ends of the loaves and means for rotating the jaws to impart a twisting action to the loaves, with means for releasing the jaws from the loaves.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 5 is a transverse vertical sectional view showing the gripping jaws and the means associated therewith.

Figure 6 is a view of the means for giving the front roller of the conveyor a step by step movement.

Figure 7 is a side view of one of the jaw assemblies.

Figure 8 is a view of one of the latch members of the assembly.

Figure 9 is a side view showing the means for operating a gear of a jaw assembly by a rack.

Figure 10 is a fragmentary view of the rear corner of the machine, showing the means for adjusting the conveyor belt.

Figure 11 is a view partly in section, showing the rollers for supporting the expanders.

Figure 12 is a section on line 12—12 of Figure 7.

Figure 1:
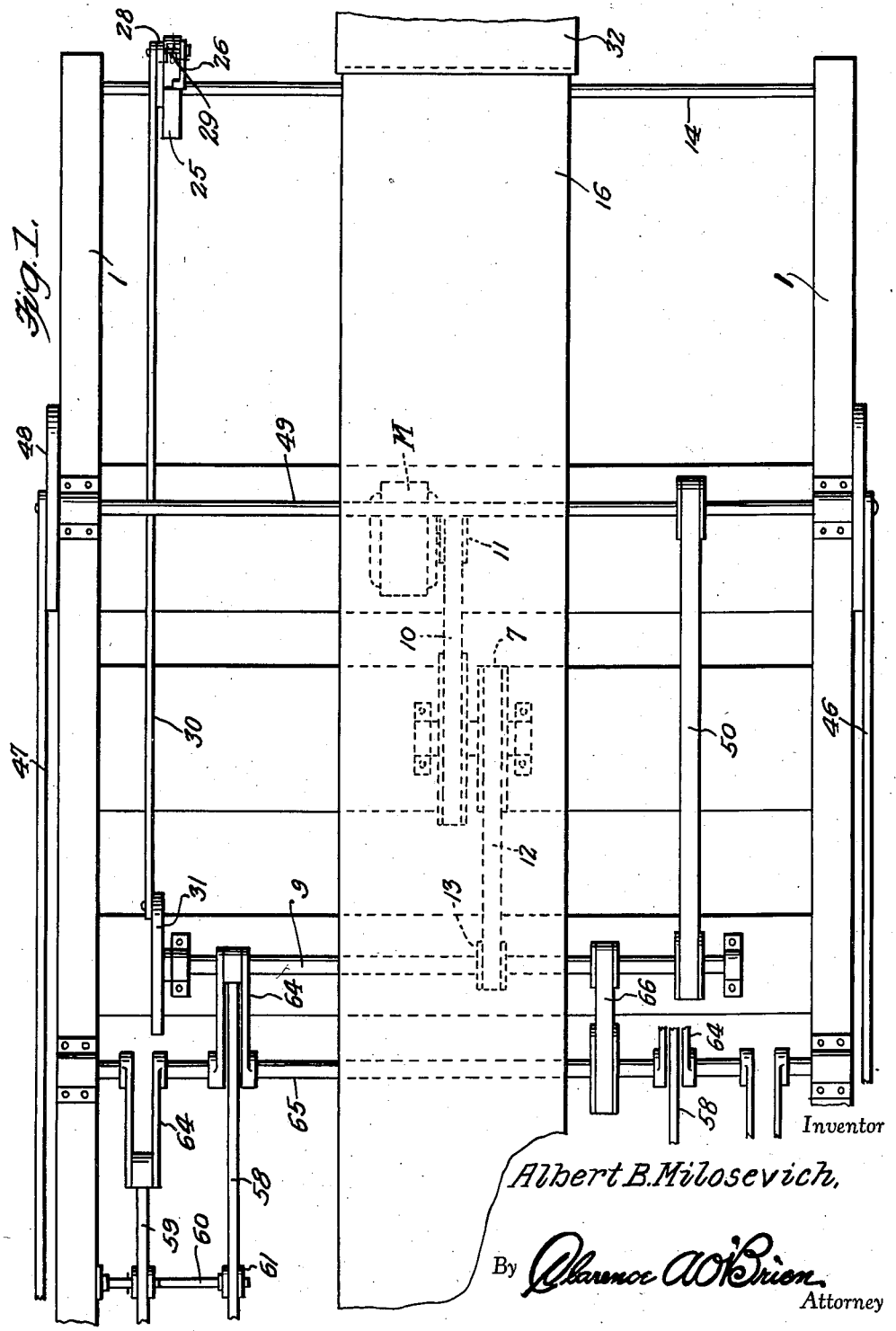
Figure 1 is a top plan view of the front end of the machine.

In these drawings, the letter A indicates a frame which includes the side members 1, the end member 2, the legs 3 and the members 4 for connecting the lower portions of the legs together, the side members 4 carrying the supports 5 for the motor M, the stub shaft 6 having the pulleys 7 thereon and the bearings 8 for the shaft 9. A belt 10 passes over a pulley 11 on the motor shaft and also passes over one of the pulleys 7 and a belt 12 passes over the other pulley 7 and over a pulley 13 on the shaft 9. A shaft 14 is rotatably supported on the top of the frame at the front thereof and carries a roller 15 for the conveyor belt 16. The rear roller for the conveyor belt is shown at 17 in Figure 10 and has its trunnions passing through slots 18 in the brackets 19 at the rear end of the frame and these trunnions can be adjusted in the slots by the screws 20 so as to take up slack in the conveyor belt. A cam 25 is fastened to the front shaft 14 and is engaged by a dog 26 pivoted as at 27 to an arm 28, the lower end of which is pivoted to the shaft 14 and a spring 29 holds the dog in engagement with the cam, (see Figures 1 and 6). A pitman 30 has its upper end pivoted to the upper end of the arm 28 and its lower end is eccentrically pivoted to a disk 31 carried by the shaft 9 so that the rotation of the shaft 9 will cause the link 30 to rock the arm 28 and thus cause the dog 26 to impart a step by step movement to the shaft 14 and the roller 15 which, of course, imparts a step by step movement to the conveyor belt 16. The loaves of bread are fed upon the front end of the conveyor belt by a chute 32 which may receive the loaves from a molding machine or from any other suitable source.

The conveyor 16 conveys the loaves to the twisting means and such means comprises a pair of jaw assemblies 33. Each assembly includes a substantially rectangular frame 34 having its inner end formed with the inwardly sloping members 35, the inner ends of which are spaced apart and the shank 36 of a jaw 37 is hinged to the inner end of each member 35, as shown at 38. Springs 39, carried by the frame 34, engage the shanks 36 and tend to press the shanks toward each other to open the jaws. A pair of bell cranks 40 are pivoted to the side members of the frame 34, as shown at 41, and each bell crank has a hook 42 at its inner end for engaging the outer end of the shank to hold the shank with the jaw in gripping relation with the other jaw, as shown in Figure 5. A spring 42' tends to move each bell crank into latching engagement with the shank of a jaw.

The outer member of each frame 34 has its central part fastened to the inner end of a stub shaft 43 and the outer end of each stub shaft has attached thereto a gear 44, these stub shafts 43 being journaled in the uprights 45 carried by the intermediate parts of the side members 1 of the frame A. A rack bar 46 meshes with the lower part of one of the gears 44 and a rack bar 47 meshes with the top part of the other gear 44 and the front ends of these rack bars are eccentrically connected to the disks 48 by the pin and slot connection 48', and said disks are fastened to the ends of a shaft 49 journaled in the side members of the frame and driven by the belt and pulleys, shown generally at 50 from the shaft 9. As will be seen, these parts are so arranged that one jaw assembly will be driven in one direction and the other assembly in the opposite direction. The pin and slot connections 48' permit the assemblies to remain stationary while the other parts continue to move.

A roller 51, carried by a bracket 52 yieldably connected to a side member of the frame by a spring and bolt 53, holds the rack bar 46 in mesh with its gear 44.

Figure 4:
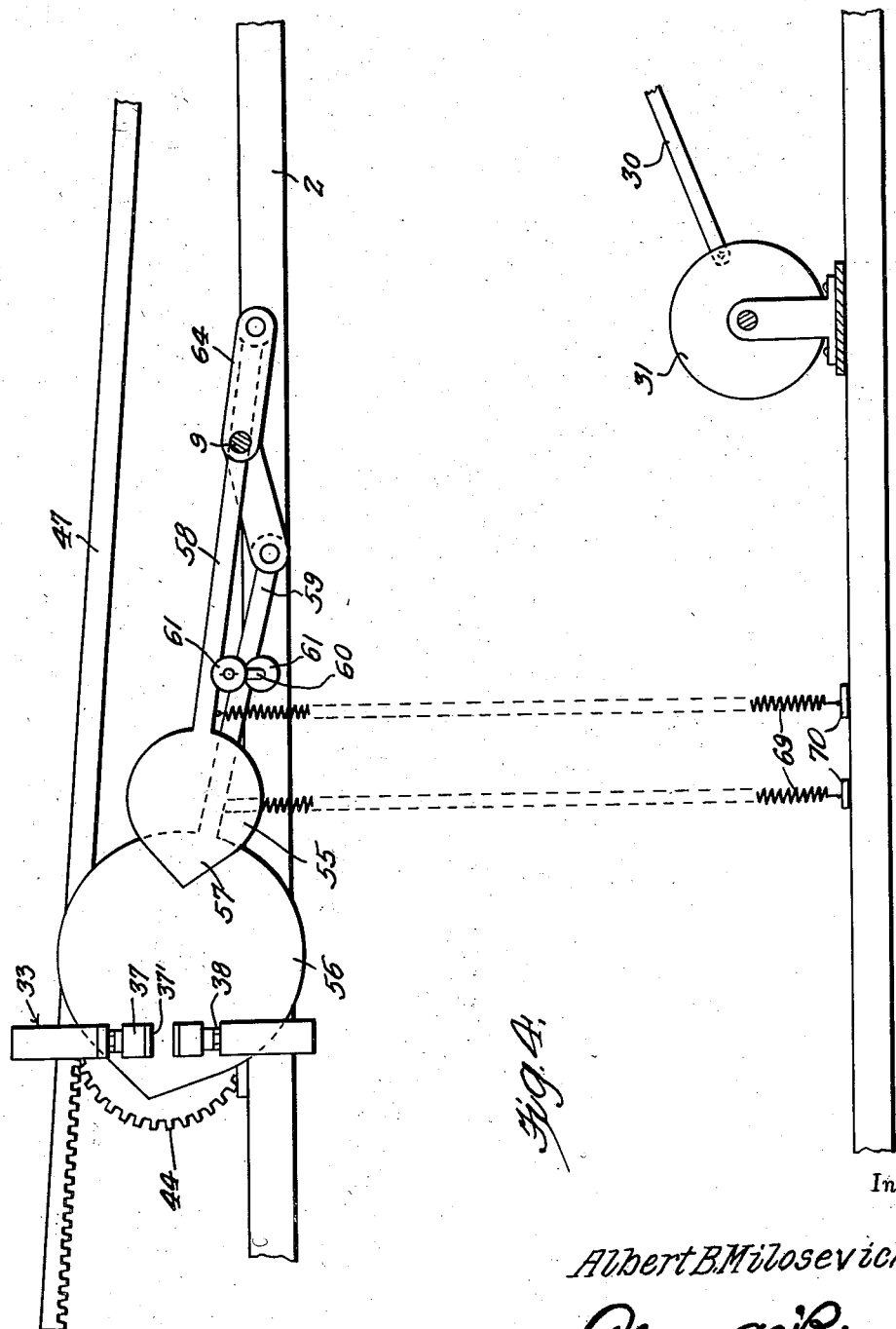
Figure 4 is an elevation with parts in section of the intermediate part of the machine.

A small expander head 55 is provided for moving each pair of jaws into gripping relation and a large expander head 56 is provided for releasing each pair of latch members 40. Each head is of substantially circular shape with its rear end pointed, as shown at 57 in Figure 4, and a shank 58 is connected to the small head and a shank 59 with the large head. A bracket 60 carries a pair of rollers 61, one for the shank 58 and the other for the shank 59, (see Figure 11). The front ends of the two pairs of shanks are connected to the cranks 64, a pair of which is formed adjacent each end of a shaft 65 which is driven from the shaft 9 by the belt and pulleys, shown generally at 66. Springs 69 have their upper ends connected with the shanks of the expander heads and their lower ends are connected with the brackets 70 and these springs hold the shanks of the expanders against the rollers 61.

Figure 2:
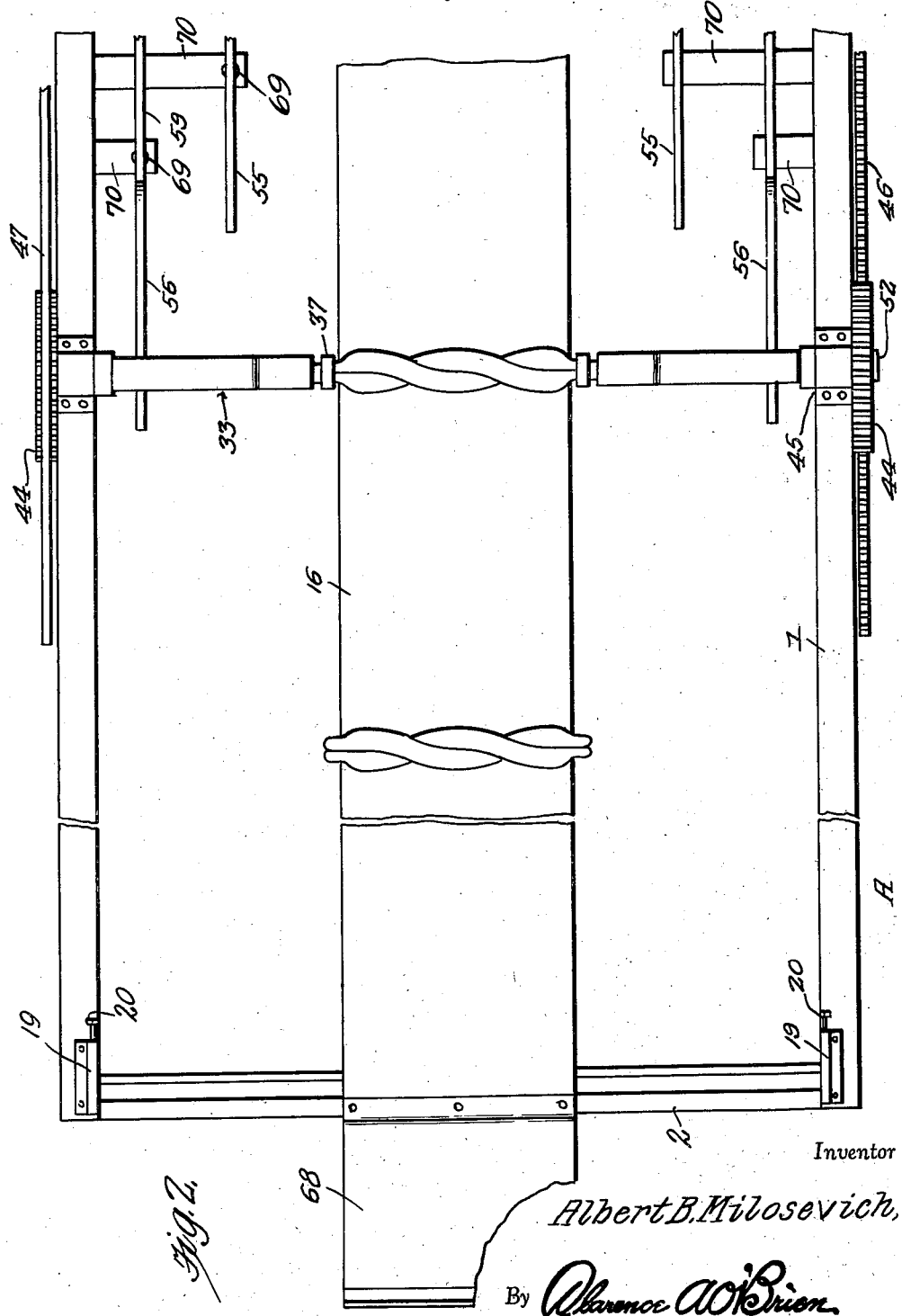
Figure 2 is a top plan view of the rear end of the machine or that part not shown in Figure 1.
Figure 3:
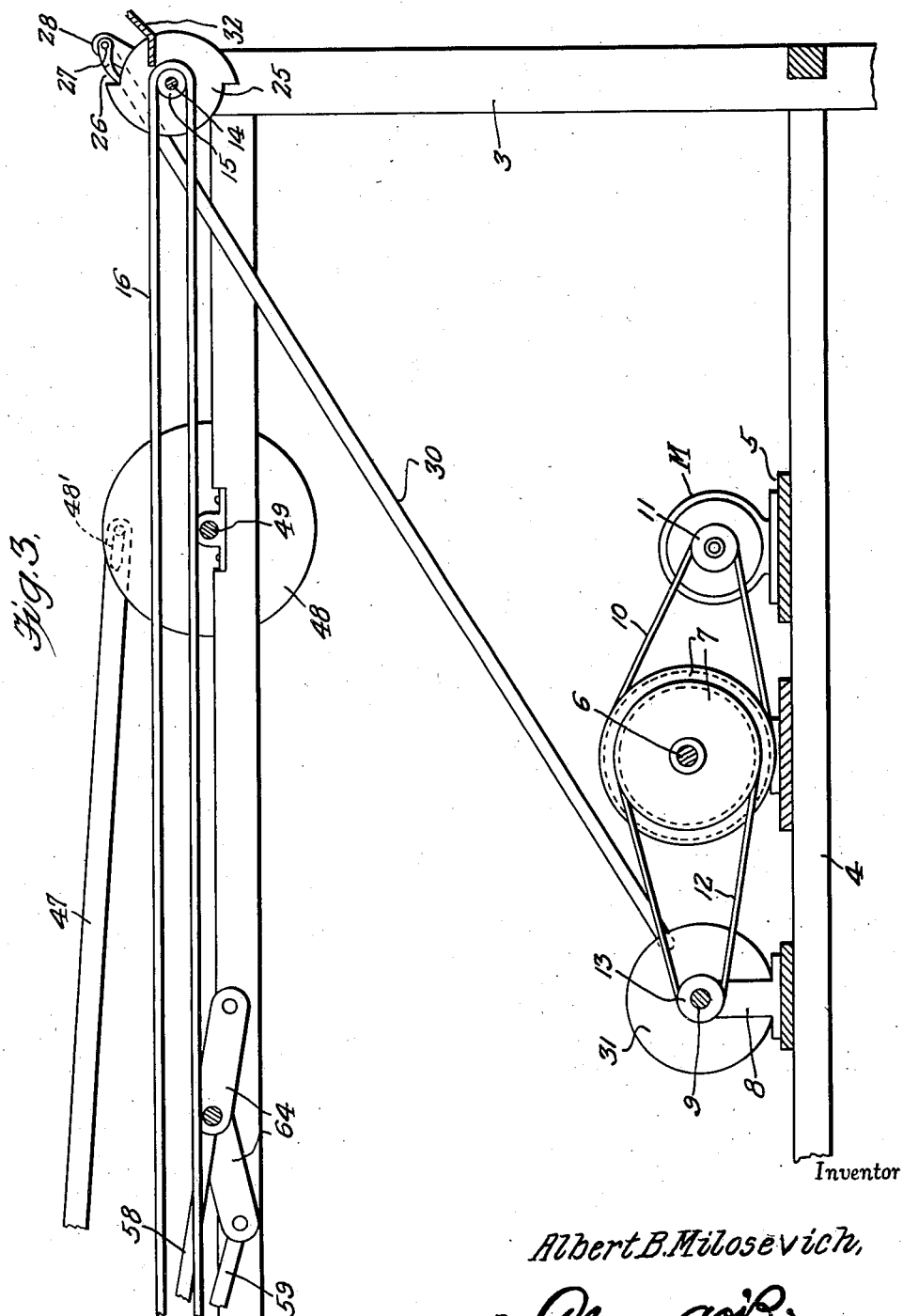
Figure 3 is an elevation with parts in section of the front end of the machine.

These parts are so arranged that as a loaf of bread is brought by the conveyor 16 adjacent the two pairs of jaws 37, which may be faced with leather or the like, as shown at 37', the heads 55 will move between the shanks 36 of the jaws so as to close the jaws on the ends of the loaf and as the shanks move apart, they will be engaged by the spring pressed latch members 40 and thus the jaws will be held in gripping relation, as shown in Figure 5, and then the heads 55 move forwardly out of the way of the jaw assemblies. The rack bars 46 and 47 then have their teeth engage with the gears 44 so that one jaw assembly is rotated in one direction and the other assembly in an opposite direction so that a twist is given the loaf, as shown in Figures 2 and 5. The toothed parts of the rack bars then run off the gears and then the large heads 56 engage the latch members 40 so as to move the same to releasing position to permit the springs 39 to move the shanks 36 toward each other and thus open the jaws and then the conveyor belt will move the loaf away from the jaw assemblies and finally deposit the twisted loaf onto the discharge chute 68.

As shown, a pair of long loaves is deposited on the conveyor belt close together so that the two loaves are twisted together, as shown in the drawings, though if desired, a single loaf can be twisted by the machine.

As before stated, the twisting of the loaves imparts a better grain and texture to the bread.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. In a device for twisting loaves of bread comprising a pair of jaw assemblies, each consisting of a pair of jaws, a shank for each jaw, a frame to which the shanks are hingedly connected, spring means for opening the jaws, latch means for holding the jaws in gripping relation, means for rotating one assembly in one direction and the other in the opposite direction, means for conveying the loaves to the jaws, means for closing the jaws on the ends of the loaves before the assemblies are rotated in opposite directions, and means for releasing the latch means after the assemblies come to rest.

2. In a device for twisting loaves of bread comprising a pair of jaw assemblies, each consisting of a pair of jaws, a shank for each jaw, a frame to which the shanks are hingedly connected, spring means for opening the jaws, latch means for holding the jaws in gripping relation, means for rotating one assembly in one direction and the other in the opposite direction, means for conveying the loaves to the jaws, means for closing the jaws on the ends of the loaves before the assemblies are rotated in opposite directions, means for releasing the latch means after the assemblies come to rest, and means for imparting a step by step movement to the conveying means.

3. A machine for twisting loaves of bread comprising a frame, a conveyor belt carried thereby, a motor, means operated by the motor for giving the belt a step by step movement, a pair of jaw assemblies carried by the frame, each assembly including a supporting frame, a pair of jaws including shanks hingedly supported by the frame, spring means carried by the supporting frame and engaging the shanks for holding the jaws in open position, latch means carried by the supporting frame for holding the shanks in jaw closing position, springs for operating the latch means, a shaft journaled in the main frame and connected with the supporting frame, a gear on the shaft, a rack bar engaging the under part of one gear, a rack bar engaging the top part of the other gear, means for reciprocating the rack bars in unison from the motor, two sets of expander heads, one set engaging the shanks of the jaws for closing the jaws, the other set engaging the latch means for releasing such means, means operated from the motor for first advancing the shank engaging heads before the jaw assemblies are rotated and for advancing the latch engaging heads for releasing the latch means after the assemblies come to rest.

ALBERT BLAISE MILOSEVICH.